United States Patent Office 2,704,281
Patented Mar. 15, 1955

2,704,281

PURIFICATION OF NOBLE METAL-METAL OXIDE COMPOSITE

Herbert R. Appell, North Riverside, Ill., assignor to Universal Oil Products Company, Des Plaines, Ill., a corporation of Delaware No Drawing. Application April 30, 1953,
Serial No. 352,308

19 Claims. (Cl. 252—413)

This application is a continuation-in-part of my co-pending application Serial No. 149,646, filed March 14, 1950, now abandoned.

This invention relates to the purification of noble metals and more particularly to a novel method of removing impurities from a composite of a noble metal and a metal oxide.

Noble metals find particular utility for use as catalysts for conversion reactions and the noble metals either are contaminated with impurities during the manufacturing and handling procedures or become contaminated with impurities during the conversion process. When utilized as catalysts, the noble metals may be used as such but usually are in combination or association with a carrier material which generally is a refractory metal oxide. Such catalyst may find utility for effecting reactions of organic compounds including dehydrogenation, hydrogenation, cyclization, hydrocracking, reforming, oxidation, etc. of organic compounds and particularly of hydrocarbons. In some cases, the catalyst as prepared contains undesirable impurities and the novel features of the present invention may be utilized to purify the catalyst or, in other cases, the catalyst becomes contaminated with impurities during use in the conversion process. While the activity of the catalyst may be restored partly by oxidation to burn off carbonaceous deposits therefrom, in most instances the activity of the catalyst is not restored to the desired degree and the features of the present invention may be utilized to obtain the desired reactivation. In any event, it eventually is necessary to replace the catalyst and the present invention offers a novel method of reactivating the catalyst.

In one embodiment the present invention relates to a method of purifying a composite of a noble metal and a metal oxide and containing impurities which comprises treating said composite with a concentrated acid and dissolving said impurities in the acid.

In another embodiment the present invention relates to a method of purifying a noble metal associated with an oxide of a metal in the left-hand columns of groups III and IV of the periodic table which comprises treating said catalyst with a concentrated acid and dissolving impurities in the acid.

In a further embodiment the present invention relates to a method of purifying a composite of a noble metal and a metal oxide and containing metal impurities which comprises treating said composite with a concentrated acid to dissolve said impurities in the acid without substantial dissolving of the noble metal and metal oxide, and washing and calcining the thus treated composite.

In a specific embodiment the present invention relates to a method of reactivating a platinum-alumina catalyst containing metal impurities which comprises treating said catalyst with concentrated hydrochloric acid and dissolving metal impurities therein, separating purified catalyst from impurities, and calcining said purified catalyst at a temperature of from about 700° F. to about 1100° F.

In a still further specific embodiment the present invention relates to a method of reactivating a catalyst comprising a noble metal and a metal oxide containing impurities which comprises treating said catalyst in a free oxygen-containing atmosphere at a temperature of from about 300° F. to about 1100° F., subsequently treating said catalyst with a concentrated acid to dissolve said impurities in the acid without substantially dissolving the noble metal and metal oxide, and washing and calcining the thus treated composite.

The noble metals for treatment in accordance with the present invention include platinum, palladium, gold, silver, iridium, rhodium, ruthenium, oxmium, etc. As hereinbefore set forth, these noble metals, when used as catalysts, are generally associated with a refractory metal oxide and particularly an oxide of a metal in the left-hand columns of groups III and IV of the periodic table including particularly the oxides of aluminum, titanium, zirconium, hafnium, thorium, etc. In some cases two or more metal oxides may be included in the catalyst, and in other cases, activating components may be included in the catalyst. These activating components generally are acidic and include halogens, particularly chlorine and fluorine, other mineral acids, organic acids, etc., the acidic component or components probably being associated with the metal oxide and/or metal in the combined state.

As hereinbefore set forth, the novel features of the present invention may be utilized for the purification of noble metals in association with refractory metal oxides and also containing, when desired, an activating component, however, the novel features of the present invention are particularly adapted to the reactivation of alumina-platinum-combined halogen catalyst which recently have been found to be of particular advantage for use in the reforming of gasoline. In the interest of simplicity the following description will be directed to the reactivation of catalyst of this type with the understanding that the novel features of the invention may similarly be applied to other noble metals and other catalyst compositions.

When treating a noble metal in association with a refractory metal oxide, it is generally desired to remove undesirable impurities without substantial removal or dissolving of the noble metal and refractory metal oxide. In the past, it has been the practice to use dilute acids in order not to dissolve the metal oxide. I have now found that, contrary to expectations, concentrated acids may be used satisfactorily to obtain removal of impurities without substantial dissolving of the noble metal or refractory metal oxide.

Any suitable concentrated acid may be used in accordance with the present invention, with the mineral acids being preferred, including hydrochloric acid, hydrobromic acid, hydrofluoric acid, hydriodic acid, sulfuric acid, phosphoric acid, nitric acid, as well as some organic acids such as oxalic acid, formic acid, etc. Preferred acid comprises hydrochloric acid which generally will be in a concentration of above about 35%, the commercially available hydrochloric acid being of the order of 37% concentration and is satisfactory for use in accordance with the present invention.

It has been found that improved results are obtained when the concentrated acid is saturated with a metal salt corresponding to that acid. For example, when hydrochloric acid is utilized for the treatment of alumina-noble metal catalyst, aluminum chloride is dissolved therein to the point of saturation. The amount of aluminum chloride will in general be very low and will depend upon the concentration of the acid employed. Similarly, when concentrated nitric acid is employed, it preferably is saturated with aluminum nitrate or, when concentrated sulfuric acid is employed, it preferably is saturated with aluminum sulfate.

In accordance with the invention the catalyst, usually after use in the reforming process and containing metallic impurities, is treated as follows: In one embodiment the catalyst may be subjected to an oxidation or burning operation to remove carbonaceous deposits therefrom or when desired, this burning operation may be effected after the acid treatment. When the carbon content of the catalyst is high it frequently is desirable to effect the burning or oxidizing of the catalyst prior to the acid treatment in order that the acid may more easily penetrate into the catalyst particles. When the catalyst is contacted with a free-oxygen-containing gas to effect oxidation of the carbon on the catalyst to remove the same, care must be taken since most noble metals are very active catalysts to effect the reaction between carbon and oxygen, and since the reaction is highly exothermic it is possible to obtain temperatures higher than are desired due to the high exothermic reaction.

The catalyst may be in any suitable particle size and usually will be in preformed shapes of uniform size as produced by pelleting, extrusion or other suitable methods and these particles may be treated in accordance with the present invention. Catalyst in the form of spheres may also be purified by this method. When desired, the catalyst may be ground into particles of irregular size and shape prior to either the oxidation treatment or the acid treatment.

Any free oxygen-containing gas may be used to effect the burning or oxidation of the catalyst and air has been found to be satisfactory to use for the reactivation. In one method a low free oxygen-containing gas may be passed over the catalyst at substantially room temperature and the temperature in the reaction zone may be slowly increased while at the same time increasing the percent of free oxygen until the desired reactivation temperature is obtained and essentially pure air is used for the reactivation. The burning or oxidation treatment is usually conducted in a temperature range of from about 300° F. to about 1100° F. The time of contact is inversely proportional to the temperature employed, that is, with higher temperatures shorter times are employed, however, in general the burning or oxidation will be effected for at least 15 minutes and time in excess of 12 hours are not particularly beneficial, especially at the higher temperatures.

The acid treatment may be effected in any suitable manner, which may be either a batch type of operation or a continuous type of operation. In a batch type of operation, the pills may be disposed in a zone and the acid poured over the pills or a zone may be partly filled with the acid and the catalyst then introduced thereto. In general, it is preferred to use an excess of cold acid because the reaction is exothermic and the excess cold acid will tend to absorb the heat of reaction. In another embodiment the catalyst may be permitted to absorb moisture from the atmosphere or by any other suitable means before the acid treatment as this further serves to reduce the exothermic heat of absorption. In general, the treatment should be effected at a temperature not greater than about 150° F. and preferably of the order of about 30° to about 90° F. The optimum temperature is dependent upon the acid, usually lower temperatures are more suitable for the stronger acids. In a semi-continuous type of operation the catalyst may be disposed in a confined zone and the acid passed therethrough in either upward or downward flow. In a continuous type of operation the catalyst and acid may be passed through a treating zone, either in countercurrent or concurrent flow to each other and each being continuously withdrawn from the treating zone, the catalyst separated by filtration or other suitable means from acid, and the acid being recycled for further use within the process, either with or without separation of the impurities. Preferably, however, it will be necessary to separate the impurities from the acid prior to recycling thereof and this may be accomplished in any suitable manner, such as by distillation, solvent extraction, etc. In some cases, it may be desirable to effect the treatment in two or more successive steps.

The time of treatment will depend upon the impurities in the catalyst but, in general, will vary from about 1 minute to 2 hours or more. This treatment will remove metallic impurities such as those of iron, nickel, sodium, etc. The necessary time of treatment may be determined by analyzing the acid withdrawn from the treating zone to determine its iron or other metallic content. The treatment will be continued until the acid is substantially free from iron or other impurities, thus establishing the effect of the treatment to remove impurities from the catalyst. For example, the acid when treating a catalyst as hereinbefore described was originally colorless and during operation turned to a pale green color to show the presence of iron. The operation was continued until the acid again became colorless and, therefore, did not contain iron impurities.

After the catalyst has been treated with acid, it may be washed to remove chlorine or other soluble impurities and this treatment preferably is effected at a temperature of below about 200° F. and usually, for convenience, at normal or room temperature. When treating a catalyst containing a halide, and particularly a chloride, in an amount in excess of that desired, the catalyst may be treated by ion exchange with a suitable reagent, such as ammonium nitrate or the like, to remove the excess halides and particularly chlorides. The catalyst then is usually washed and is dried at a temperature of from about 200° F. to about 600° F. for 2 to about 24 hours or more and finally calcined, preferably in air, at a temperature of from about 700° F. to about 1100° F. for about 1 hour to about 12 hours or more. When desired, the catalyst may be gradually heated to drying temperature and maintained at that temperature for the desired time and then is heated to the higher temperature desired for calcination and held at that temperature for the desired time. The calcination treatment in air serves to burn off carbonaceous deposits when not previously removed as hereinbefore set forth.

When the catalyst to be treated in accordance with the present invention is in the form of particles of definite sizes and shapes and particularly pills or pellets of uniform size and shape as may be formed by pelleting, extrusion or other suitable methods, it is preferred that the treatment will not weaken the strength of the catalyst particles. It has been found that treatment with concentrated hydrochloric acid or concentrated nitric acid does not substantially weaken the structural strength of the catalyst pills, especially when the catalyst is subjected to calcination in air subsequent to the acid treatment.

The following examples are introduced to illustrate further the novelty and utility of the present invention but not with the intention of unduly limiting the same.

*Example I*

The catalyst used in the following examples comprised alumina, 0.3% by weight of platinum, 0.12% by weight of combined fluorine and 0.45% by weight of combined chlorine and was in the form of ⅛" x ⅛" pills. This catalyst had been used for the reforming of a Midcontinent naphtha for a period of 139 days in a pilot plant operation. In order to compare on an equal basis the activity of the catalyst after the various treatments, different samples of the catalyst, as received from the pilot plant and after various treatments to be hereinafter set forth, were utilized for the reforming of a Midcontinent naphtha in a test unit operating at a temperature of 977° F., a pressure of 300 pounds per square inch and utilizing a hydrogen:hydrocarbon mol ratio of 1.8:1. This test was continued for a period of 18 hours.

When tested in this manner, the catalyst as received from the pilot plant produced a gasoline product having an initial specific dispersion of 136.2 but after 18 hours of operation the specific dispersion of the gasoline product dropped to 115.8. The specific dispersion of the gasoline product is an indication of the aromatic content of the gasoline. A higher specific dispersion indicates a higher aromatic content and conversely a lower specific dispersion indicates a lower aromatic content.

In order to determine whether the deactivation of the catalyst was due to the deposition of carbonaceous material thereon, a sample of the catalyst was subjected to oxidation in the presence of air at a temperature gradually increasing to 925° F. and maintained at that temperature for 1 hour. The regenerated catalyst was tested as described above and the initial specific dispersion of the gasoline product was 140.3 which after 18 hours fell to 125.6. This, therefore, shows that burning of the carbonaceous deposits from the catalyst, while restoring the initial activity of the catalyst, did not restore the life of the catalyst because the specific dispersion of the product fell to 125.6.

Therefore, it is concluded that the cause of deactivation of the catalyst is due to other reasons and more particularly to metallic impurities in the catalyst. However, in an attempt to measure the metallic impurities in the catalyst by emission analysis, it was found that these results were not conclusive apparently due to the small amounts of metals in the catalyst. However, when treating the catalyst with concentrated acid, the effluent acid gave a strong test for iron. This definitely proves the presence of metallic impurities, and the belief that these impurities deactivate the catalyst is confirmed by the improved results obtained with the acid treated catalyst.

Another sample of the spent catalyst from the pilot plant was treated with concentrated hydrochloric acid saturated with aluminum chloride as follows. 15 grams of aluminum chloride hexahydrate were added to 500 ml.

of 37% concentration hydrochloric acid and the mixture was allowed to stand overnight. 100 ml. of this solution was placed in a flask and 42.9 gms. of catalyst received from the pilot plant were gradually added thereto. The solution became quite warm and gradually turned a pale green. The solution was withdrawn from the catalyst and when tested with thiocyanate reagent gave a strong test for iron. The catalyst was extracted three more times with additional concentrated hydrochloric acid solution saturated with aluminum chloride, and the last effluent acid gave a negative test for iron. The catalyst pills were in contact with the acid for a total of 2 hours. The catalyst pills were then rinsed and washed thoroughly with water, after which the catalyst pills were treated with 5% ammonium nitrate solution to remove excess chlorine, and were again washed with water. The pills were then oxidized at a temperature gradually increasing to 932° F. and maintained at that temperature for 1 hour in order to burn off carbonaceous deposits therefrom.

When tested in the manner hereinbefore set forth, the acid treated and calcined catalyst pills produced a gasoline product having an initial specific dispersion of 139.5 and a final specific dispersion after 18 hours of 136.6. It is seen from these data that the initial activity of the catalyst was substantially restored and that the life of the catalyst was greatly improved because the specific dispersion dropped to only 136.6 after 18 hours as compared to a drop to 115.8 for the untreated catalyst and to a drop to 125.6 for the catalyst which had been regenerated only by burning carbonaceous deposits therefrom. Further, the structural strength of the catalyst pills was not impaired by this treatment.

*Example II*

A sample of an alumina-platinum catalyst was treated with concentrated nitric acid saturated with aluminum nitrate. This treatment removed metallic impurities from the catalyst but did not dissolve the alumina or platinum to any noticeable extent.

*Example III*

A zirconia catalyst was treated with concentrated hydrochloric acid saturated with aluminum chloride and it was found that the zirconia did not dissolve in the concentrated acid.

*Example IV*

A titanium oxide catalyst was treated with concentrated hydrochloric acid saturated with aluminum chloride and here again it was found that the titanium oxide was not dissolved to a noticeable extent.

I claim as my invention:

1. A method of purifying a composite of a noble metal and a metal oxide and containing metal impurities which comprises treating said composite with a concentrated acid to dissolve said impurities in the acid without substantial dissolving of the noble metal and metal oxide, and washing and calcining the thus treated composite.

2. A method of purifying a composite of a noble metal and a metal oxide and containing metal impurities which comprises treating said composite with a concentrated mineral acid saturated with a metal salt of said acid to dissolve said impurities in the acid without substantial dissolving of the noble metal and metal oxide, and washing and calcining the thus treated composite.

3. A method of purifying a composite of a noble metal and a metal oxide and containing metal impurities which comprises treating said composite with concentrated hydrochloric acid to dissolve said impurities in the acid without substantial dissolving of the noble metal and metal oxide, and washing and calcining the thus treated composite.

4. A method of purifying a composite of a noble metal and alumina and containing metal impurities which comprises treating said composite with concentrated hydrochloric acid saturated with aluminum chloride to dissolve said impurities in the acid without substantial dissolving of the noble metal and metal oxide, and washing and calcining the thus treated composite.

5. A method of purifying a composite of platinum and a metal oxide and containing metal impurities which comprises treating said composite with concentrated hydrochloric acid to dissolve said impurities in the acid without substantial dissolving of the noble metal and metal oxide, and washing and calcining the thus treated composite.

6. A method of purifying a catalyst composite comprising a noble metal and a metal oxide and containing metal impurities which comprises treating said composite with a concentrated mineral acid to dissolve said metal impurities in the acid without substantial dissolving of the noble metal and metal oxide, and washing and calcining the thus treated composite.

7. A method of purifying a catalyst comprising a noble metal and an oxide of a metal in the left-hand columns of groups III and IV of the periodic table and containing metal impurities, which comprises treating said catalyst with a concentrated mineral acid to dissolve said metal impurities in the acid without substantially dissolving the noble metal and metal oxide withdrawing said acid, and subjecting said catalyst to calcination at a temperature of from about 700° to about 1100° F.

8. The method of claim 7 further characterized in that said oxide comprises aluminum oxide.

9. The method of claim 7 further characterized in that said oxide comprises zirconium oxide.

10. The method of claim 7 further characterized in that said oxide comprises titanium oxide.

11. The method of claim 7 further characterized in that said oxide comprises thorium oxide.

12. A method of reactivating an alumina-platinum catalyst containing metal impurities which comprises treating said catalyst with concentrated hydrochloric acid at a temperature below about 150° F. whereby to dissolve metal impurities in said acid, without substantially dissolving the platinum and alumina, removing acid containing metal impurities from the catalyst, and calcining said catalyst in the presence of air at a temperature of from about 700° F. to about 1100° F.

13. The method of claim 12 further characterized in that said concentrated hydrochloric acid is saturated with aluminum chloride.

14. The method of claim 12 further characterized in that said catalyst also contains combined halogen.

15. A method of reactivating a catalyst comprising a noble metal and a metal oxide, containing metal impurities and carbon which comprises heating said catalyst in a free oxygen-containing gas at a temperature of from about 300° F. to about 1100° F., subsequently treating said catalyst with a concentrated acid to dissolve said impurities in the acid without substantially dissolving the noble metal and metal oxide.

16. A method of reactivating an alumina-platinum catalyst containing metal impurities and carbon which comprises heating said catalyst in a free oxygen-containing atmosphere at a temperature of from about 300° F. to about 1100° F., subsequently treating said catalyst with concentrated hydrochloric acid at a temperature below about 150° F. whereby to dissolve metal impurities in said acid without substantially dissolving the platinum and alumina, removing acid containing metal impurities from the catalyst and calcining said catalyst.

17. The method of claim 16 further characterized in that said concentrated hydrochloric acid is saturated with aluminum chloride.

18. The method of claim 16 further characterized in that said catalyst also contains combined fluorine.

19. The method of claim 16 further characterized in that said catalyst also contains combined chlorine.

References Cited in the file of this patent

UNITED STATES PATENTS

| | | |
|---|---|---|
| 2,006,221 | Ridler | June 25, 1935 |
| 2,344,208 | Kirkpatrick | Mar. 14, 1944 |
| 2,346,844 | Hull | Apr. 18, 1944 |
| 2,456,633 | Haensel | Dec. 21, 1948 |
| 2,474,440 | Smith et al. | June 28, 1949 |